Dec. 24, 1957 F. T. ROBERTS ET AL 2,817,129
HOSE CLAMP
Filed June 4, 1956

INVENTOR.
FRED T. ROBERTS
ROBERT E. ROBERTS
BY
I. Louis Wolk
ATTORNEY

United States Patent Office 2,817,129
Patented Dec. 24, 1957

2,817,129

HOSE CLAMP

Fred T. Roberts and Robert E. Roberts, Wilton, Conn.

Application June 4, 1956, Serial No. 589,228

4 Claims. (Cl. 24—27)

This invention relates to a hose clamp, and more specifically to a self-locking type of hose clamp for securing or attaching resilient hose to rigid tubing that is inserted therein.

Hose clamps of the type used heretofore have consisted of a single loop of flexible, yet rigid, metal wire with upstanding ends capable of being forced apart by means of special tools, held in this forced apart position while installing over a hose, then released to allow the clamp to seal the hose on the rigid tubing or piping around which the hose is placed. There are, however, a number of faults to be found with these devices, which it is the purpose of the present invention to remedy.

Primarily, the act of holding the ends of the clamp apart with a tool while maneuvering delicately to insert it over the desired hose clamp is fraught with peril to the fingers and temper of the hapless mechanic. It is inevitable that an incautious movement may cause the tool or the clamp to brush against an obstacle such as may be found in the vicinity of hose and tubes. This usually dislodges the grip of the tool upon the clamp and the procedure must be started afresh. Any mechanic would agree that it is infinitely desirable to lock the clamp in its open position. Coupled with this feature, the same mechanic has often indicated that such a clamp should be simple to release.

A second disadvantage of conventional clamps lies in the fact that pressure of the loop causes it to sink into the hose at least as far as the major diameter of the loop. This causes a weakening in the tension of the clamp because it no longer is at its optimum diameter; that is, the diameter which permits exertion of the maximum pressure. It is desirable that this condition be improved in order to maintain a true seal.

A third fault with the conventional clamp lies in the fact that it is possible to open the clamp too far and distort the material. At the very least, the elastic limit of the material may be exceeded and allow the closed diameter of the clamp to increase, thus reducing the clamping pressure below the sealing point. At the worst, the clamp may actually break. Safeguards against such an occurrence are necessary.

These problems are solved by means of this invention by providing a plurality of loops and by a novel method of fabricating the ends of the loops. The ends are formed into a position that is highly critical and capable of being twisted by simple means in order to lock the clamp in its open position, thus solving the first of the problems. The use of multiple loops imparts extra rigidity and strength and allows the displaced hose material to be held between the loops instead of sinking under a single clamp, thus solving the second problem. A combination of both above features solves the third problem as will be further described.

It is the principal object of the invention, therefore, to provide a novel clamping device that is of simple construction.

It is a further object to provide a clamp with high strength characteristics.

It is an additional object to provide a clamp which is self-locking in the open position.

It is still another object to provide a clamp which may be unlocked again by simple means.

A further object is the provision of a clamping device that will remain at maximum sealing strength.

These and other objects will be readily apparent in the following description and drawings in which.

Figure 1:
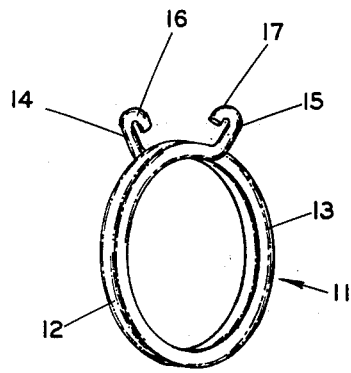
Figure 1 is a perspective view of the principal form of our invention.
Figure 2:
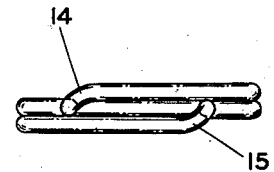
Figure 2 is a top view of the device of Figure 1, shown in closed position.
Figure 3:
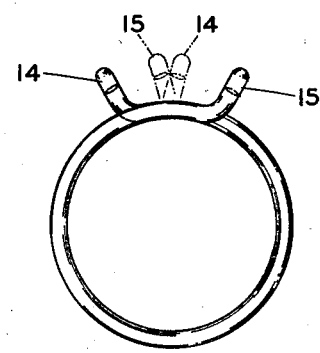
Figure 3 is a front view of the device of Figures 1 and 2.

The principal form of the invention, as illustrated in Figures 1, 2, and 3, is embodied in a clamp 11 consisting essentially of a plurality of adjacent helical or spiral loops 12 and 13. Although only two loops are shown in the drawing, any number may be formed if desired. These loops may be formed of one continuous piece of wire of round or rectangular cross-sections, or by joining separate loops by such methods as welding, brazing, or spotwelding. The loop 12 terminates in an end 14, extending radially outward and bent into a hook 16 at its extremity as shown in Fig. 1, and also bent laterally at an angle toward the other loop 13, as shown in Figure 2. The loop 13 terminates in end 15, also extending radially outward and bent into a hook 17 at its extremity as shown in Fig. 1, and bent laterally at an angle toward loop 12. The two hooked ends are therefore in a different plane from the corresponding loops. When it is desired to open the clamp, the ends are squeezed toward each other by means of a pair of pliers or comparable tool, then twisted slightly in a lateral direction to allow them to clear each other, and finally twisted back into their original plane. This allows the ends 14 and 15 to interlock, as shown in phantom in Figure 3, thus holding the clamp open. Closing of the clamp is accomplished by twisting the ends laterally away from each other by insertion of a screw driver or other tool between them, thus allowing them to unlock.

Figure 5:
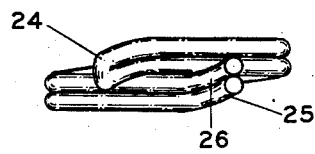
Figure 5 is a top view of the device of Figure 4 shown in closed position.
Figure 4:
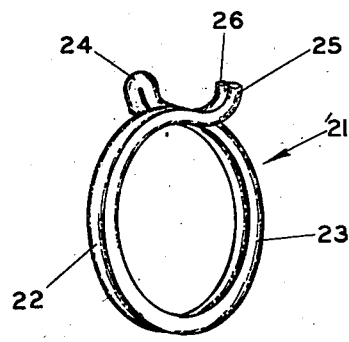
Figure 4 is a perspective view of a modification of the devices of Figures 1, 2, and 3.
Figure 6:
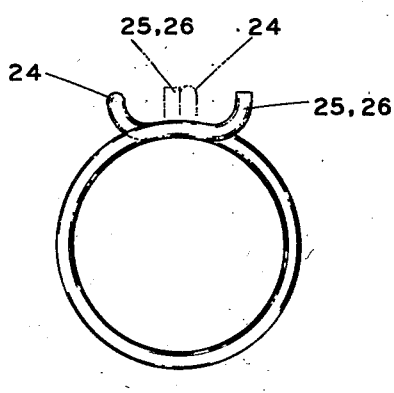
Figure 6 is a front view of the device of Figure 4.

In the modification of Figures 4, 5, and 6, the principle of the form just described is further illustrated. The clamp 21 consists of the loops 22 and 23. The loops terminate in a closed end 24, extending radially outward and bent laterally at an angle out of the plane of the loops; and in open ends 25 and 26 also extending radially outward and bent laterally at an angle out of the plane of the loops toward end 24. This clamp may be made by bending one length of wire in half and forming the loops as shown, but if desired, the clamp might be made by placing two equal lengths of wire together and forming the loops. In that case, the end 24 would be open, rather than closed. The clamp 21 is opened similarly to clamp 11; that is, by squeezing the ends 25 and 26 toward end 24 while giving a lateral twist to engage the ends. Closing is again accomplished by a slight twist to disengage the ends, thus allowing the rigidity of the loop structure to return the clamp to its closed position.

Thus it can be seen that by means of this invention, a clamp of great strength and rigidity is provided which may be easily locked in the open position. The combination of a multiple loop structure and the laterally bent ends result in this accurate locking device. The clamps described in both forms of the invention are formed of steel or other metal with the desired inherent springiness required. The loops are so fabricated that the clamp will normally be in its closed or clamping position with each loop tending to assume a desired minimum when the ends are not interengaged.

Other modifications may be made within the spirit of the invention. We do not intend to be limited by the details shown, but what is claimed is:

1. A clamp consisting of a length of springy material formed into a plurality of adjacent helical loops and terminating in ends extending radially outward from said loops, said loops imparting a springiness tending to keep said clamp in a closed position, said ends extending toward each other laterally at an angle with the plane of said loops to permit them to become interengaged when brought toward each other in a direction parallel to the plane of the loops, said interengagement overcoming the springiness sufficiently to lock the clamp in an open position.

2. A clamping device for resilient hose and the like adapted to encircle and grip said hose in a closed position, consisting of a length of springy material formed into a plurality of adjacent helical loops terminating in ends extending toward each other laterally at an angle with the plane of the loops and said ends extending radially outward from said loops, said loops imparting a springiness tending to keep said clamp in a closed position, said ends divergent from said other when the clamp is open but capable of interengagement with each other when moved in a direction parallel to the plane of the loops in order to overcome the springiness sufficiently to keep the clamp in an open position.

3. The clamp of claim 2 in which the extremities of the ends are in the shape of hooks bent laterally of the plane of the loops and toward each other.

4. A clamp consisting of a length of springy material folded against itself at the center to form a double length of material with a closed loop at one end and the original ends in contact to form a doubled end, said double length formed into a plurality of adjacent helical loops, said closed end and said doubled end extending toward each other laterally at an angle with the plane of the loops and radially outward from said clamp, said ends divergent from each other when the clamp is open but capable of interengagement with each other when moved in a direction parallel to the plane of the loops in order to keep the clamp in a locked position.

References Cited in the file of this patent

UNITED STATES PATENTS

| | | |
|---|---|---|
| 1,465,792 | Rutledge | Aug. 21, 1923 |
| 2,006,358 | Kurkjian | July 2, 1935 |